United States Patent [19]
Moore

[11] 3,752,641
[45] Aug. 14, 1973

[54] FURNACE FOR BLOW MOULDING METHOD AND APPARATUS

[75] Inventor: Lawrence A. Moore, King of Prussia, Pa.

[73] Assignee: Beloit Corporation, Beloit, Wis.

[22] Filed: July 28, 1972

[21] Appl. No.: 276,056

Related U.S. Application Data

[62] Division of Ser. No. 3,003, Jan. 15, 1970, abandoned.

[52] U.S. Cl. .................................. 432/57, 432/122
[51] Int. Cl. ............................................... F27b 9/24
[58] Field of Search .................. 263/8 R, 2; 34/203, 34/30; 432/57, 122, 230

[56] References Cited
UNITED STATES PATENTS

| | | | |
|---|---|---|---|
| 3,627,282 | 12/1971 | Kinslow, Jr. | 263/8 R |
| 2,925,260 | 2/1960 | Dickey | 263/8 R |
| 1,994,220 | 3/1935 | Hormel | 263/8 R |

*Primary Examiner*—John J. Camby
*Attorney*—Larson and Taylor

[57] ABSTRACT

An improved oven for heating elongated articles such as parisons just prior to blow molding. Air is heated externally of the oven and blown uniformly therethrough as the elongated articles travel continuously back and forth through the oven.

13 Claims, 16 Drawing Figures

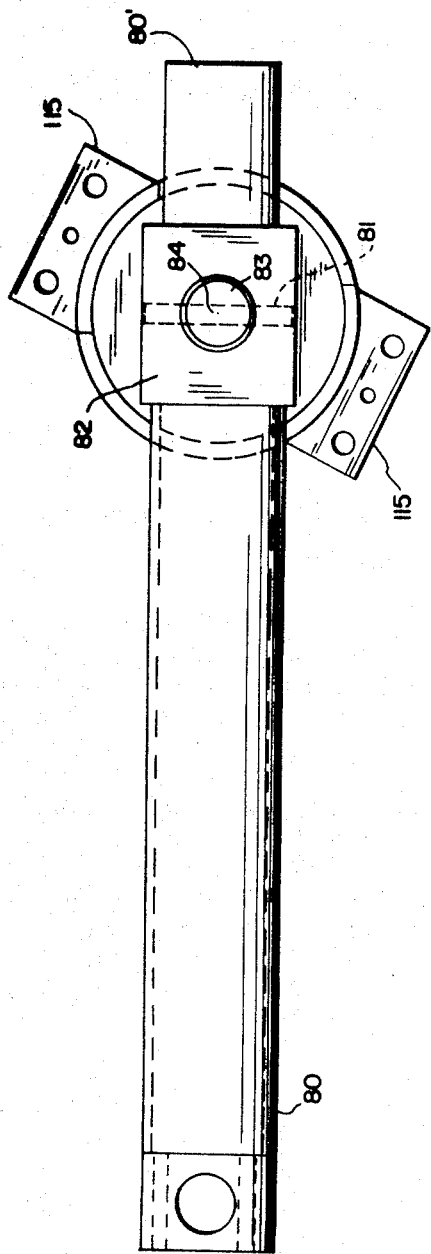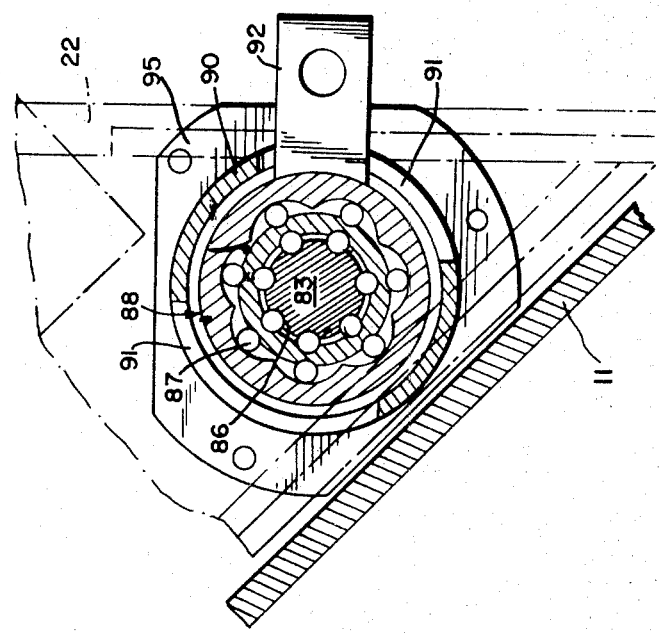

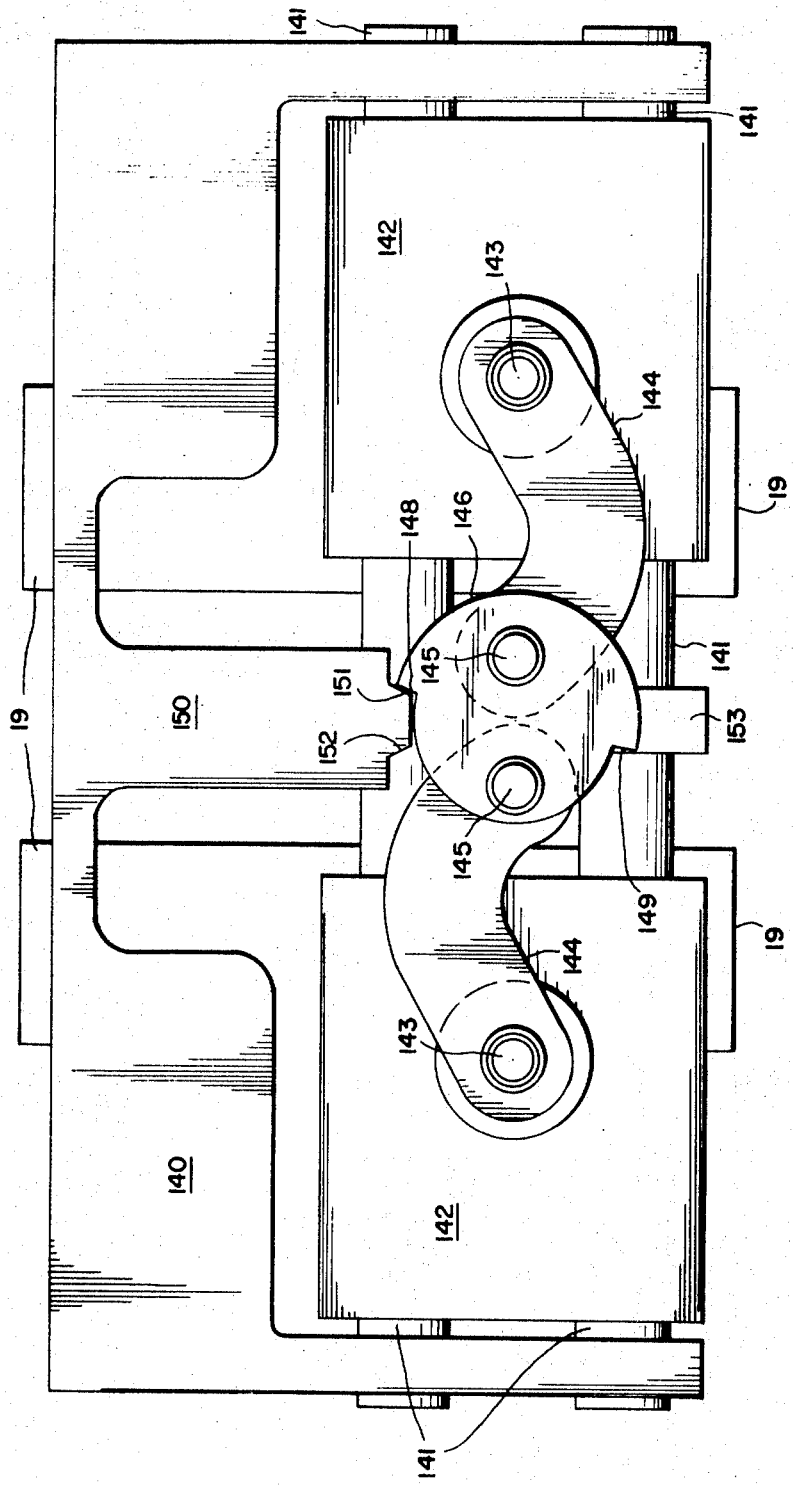

FURNACE FOR BLOW MOULDING METHOD AND APPARATUS

This is a division, of U.S. Pat. application Ser. No. 3003 filed Jan. 15, 1970, now abandoned.

BACKGROUND OF THE INVENTION

This invention relates to blow moulding, and in particular it relates to a new and improved method and apparatus for heating and blow moulding cold parisons to form containers such as bottles and the like.

Numerous products such as foods, liquid soaps, etc. are now packaged and sold in non-breakable containers, referred to generally as "plastic bottles." These containers, which are commonly made from a polyolefin such as polypropylene are normally manufactured, inter alia, by extruding the material into an elongated endless hollow tube. Cut pieces of the tube, referred to as parisons, are used to form the said plastic bottles by blow moulding techniques. Although numerous different materials may be used, for convenience, this specification will refer specifically to polypropylene.

Since the parisons must be hot when they are formed into bottles, the original technique was to take the parisons, as soon as they were formed by the extrusion apparatus, and while they were still hot, and to transfer them directly to the blow moulding apparatus whereat they were stretched and moulded into the desired shape. However, it has been found undesirable to necessarily link together the process of forming the parisons and the process of forming bottles from the parisons. To the contrary, it has been found more desirable to separate these two functions. The parisons can then be formed into bottles at a later time or they can be sold to others who may have facilities for forming bottles from parisons but who may not have facilities for initially forming the polypropylene parisons.

The separation of these two functions of course means that the process of forming the bottles must start with cold parisons which must first be heated. Consequently, this technique has become known as the cold parison technique.

In known cold parison techniques, the parisons are first conveyed through an oven with the tubular parisons upright on vertical pins. At a moulding station, a gripper grips the bottom of a given parison and lifts the same upwardly until the top is engaged by a head platen which holds the parison and forms the threads and the neck of the bottle at the top thereof as the gripper moves downwardly to stretch the parison, after which the mould is closed and air is blown into the mould from above through the head platen to form the bottle. The mould is then opened and the finished bottle is ejected from the moulding station.

While this known technique has proved relatively successful, it suffers from at least the following disadvantages. First, the apparatus for carrying out this technique is quite complicated. Secondly, the operation of this technique requires a rather high cycle time of 12 seconds per bottle in mass production (for a given moulding station).

Thus, there exists a need for an improved blow moulding method and apparatus which is more simplified than apparatus known heretofore, and which will permit more rapid, and hence more efficient production of bottles from cold parisons.

SUMMARY OF THE INVENTION

Thus, it is a purpose of this invention to provide a new and improved blow moulding method and apparatus for rapidly converting cold parisons into containers such as bottles in a manner which is more simplified and economical than previously known techniques.

The purpose of the invention is achieved by providing an arrangement wherein the various stages of operation are quite simplified in and of themselves and are arranged to cooperate with each of the other stages such that the parisons are carried through the various stages in a most rapid and efficient manner.

In a preferred arrangement of the invention, the parisons are first fed into and conveyed through an oven which includes new and advantageous features for assuring prompt and uniform heating of the parisons. The oven is so arranged that when a given parison has reached the proper forming temperature, it arrives at a discharge station.

The mould is located at a mould station adjacent the oven in the vicinity of the said discharge station thereof. A thread forming mean is mounted at one end of the mould and is adapted to engage one end, preferably the lower end, of a heated parison to form the neck and the threads of the bottle therefrom and to hold that end of the parison as the other end is moved during a stretching procedure immediately prior to the closing of the mould which is of course followed by the injection of pressurized air into the bottle while the mould is closed to shape the bottle therein. After the bottle has been formed, the mould is opened and air may be injected again, this time to move the finished bottle into the flared open end of a tube through which the finished bottle may be removed.

An important feature of the present invention includes means for handling the parison between the discharge station of the oven and the thread forming means at the moulding station. This means comprises a transfer assembly which includes a generally vertical post attached to the base of the apparatus, a generally horizontal transfer arm extending outwardly from the post and a generally vertical picker arm extending downwardly from the outer end of the transfer arm. The picker arm includes jaws for engaging and holding parisons. The transfer arm-picker arm assembly is movable horizontally preferably for being turned in a curved path, and also vertically.

In the operation of the apparatus, the transfer arm-picker arm assembly is lowered into the oven at the discharge station such that the picker arm jaws grab the top of a properly heated parison. The transfer arm-picker arm assembly then rises out of the oven and turns until it reaches a point over the thread forming means whereat the parison is lowered such that the lower end of the parison may be engaged by the said thread forming means. This latter means forms the opening which will later comprise the opening of the bottle (for example, this opening may include a neck and/or threads) and this means will continue to hold the bottom of the parison as the transfer arm-picker arm assembly, while still holding the upper end of the parison, moves upwardly to stretch the parison. After stretching, the mould is closed and air is injected through the said opening of the bottle to shape the bottle within the mould. As the bottle is being formed in the mould, the transfer arm-picker arm assembly swings back to its original position over the discharge station of the oven. Conveniently, a scrap chute can be provided between the discharge station and the mould station whereat the transfer arm-picker arm assembly may stop momentarily and open to release the scrap upper portion of the parison.

After the moulding step, the mould is opened and additional air may be injected into the bottle. However, with the mould open, this additional air may throw the bottle upwardly. A flared end tube is conveniently placed above the mould for receiving the upwardly hurled finished bottle and removing the same from the moulding apparatus.

With this preferred arrangement of the invention, cycle time for a given moulding station may be substantially reduced since wasted motion is substantially reduced, if not eliminated. For example, the present cycle time is 7 to 8 seconds per bottle and it is believed that this can be reduced to 6 seconds which includes 4 seconds with the mould closed. This is made possible by the interrelationship of the various parts of the apparatus. For example, during the 4 seconds that the mould is closed, the transfer arm-picker arm assembly can discharge the scrap end of the parison, pick up a new parison and swing this new parison over to a point just adjacent to the mould. The remaining 2 seconds during the mould open position would be required merely to eject the finished bottle, lower the new parison to the threading and holding means and to stretch the parison by raising the transfer arm-picker arm assembly.

The present invention includes many new and advantageous features which will be explained in greater detail below.

Thus, it is an object of this invention to provide a new and improved method and apparatus for blow moulding containers from cold parisons.

It is another object of this invention to provide a rapid but yet a simplified method and apparatus for forming containers from cold parisons by blow moulding techniques.

It is another object of this invention to provide a method and apparatus including an oven, a transfer arm-picker arm assembly, a moulding means and a thread forming and holding means, which means cooperate with each other in such a manner as to permit a substantial reduction in cycle time per container in the formation of containers in the cold parison blow moulding technique.

Another object of this invention is to provide a new and improved oven for efficiently and uniformly heating a large number of parisons.

Other objects and advantages of the present invention will become apparent from the detailed description to follow together with the accompanying drawings.

BRIEF DESCRIPTION OF THE DRAWINGS

There follows a detailed description of a preferred embodiment of the present invention to be read together with the accompanying drawings, the description and the drawings being provided only to illustrate a preferred embodiment of the invention.

FIG. 9 is a sectional view taken along line 9—9 of FIG. 8.

FIG. 10 is a sectional view taken along line 10—10 of FIG. 8.

FIG. 11 is an elevational view of a mould closing clamp and is taken along line 11—11 of FIG. 2.

DETAILED DESCRIPTION OF THE PREFERRED EMBODIMENT

Figure 1:
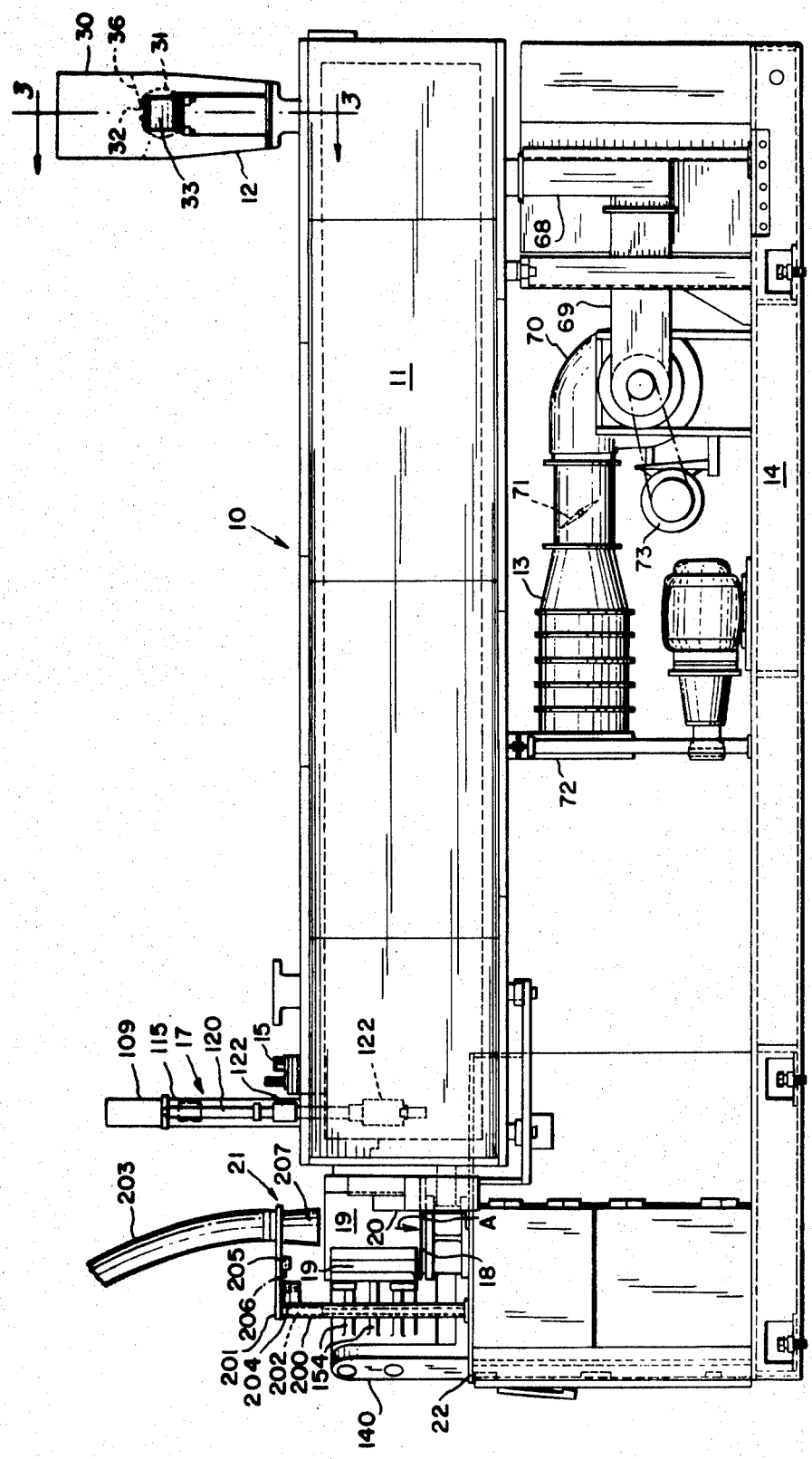
FIG. 1 is an elevation view of a parison treatment assembly constructed in accordance with the features of the present invention.

Referring now to the drawings, like elements are represented by like numerals throughout the several views.

Figure 2:
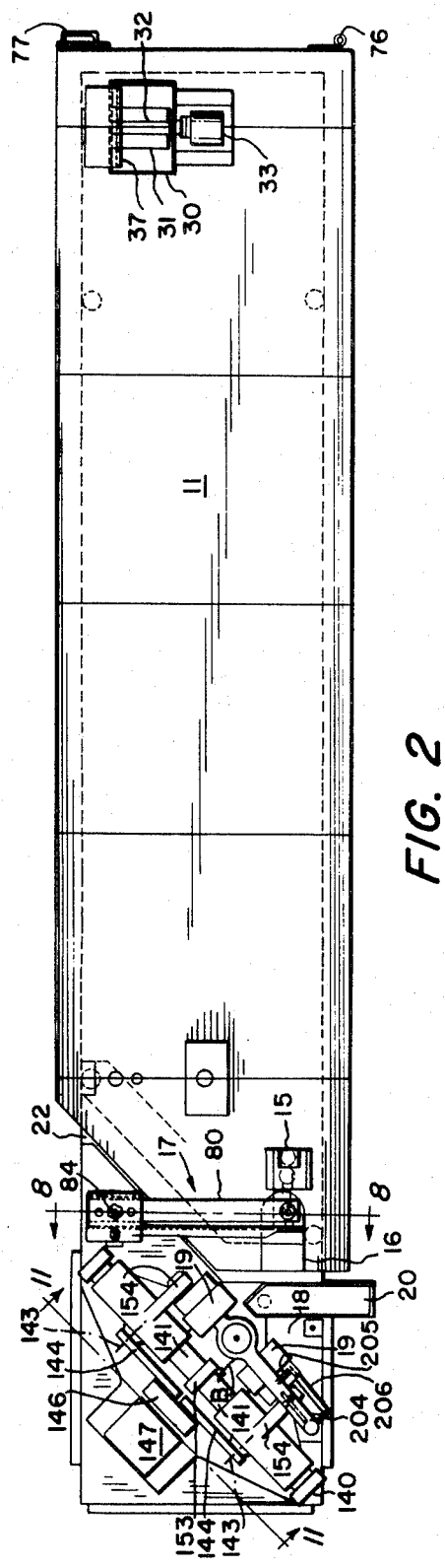
FIG. 2 is a plan view of a parison treatment assembly as shown in FIG. 1.

FIGS. 1 and 2 illustrate the overall apparatus of the present invention. A parison treatment apparatus 10 comprises a horizontally elongated oven 11 including a parison feeder 12 at one end thereof for feeding tubular parisons into the oven. Hot air is transmitted to the oven through electric heater 13.

The entire apparatus including the oven, the heater and all other elements are mounted above the floor on a steel base structure 14.

At the end of the oven opposite from the feeder 12, there is provided a discharge station including an opening 16 formed in the top of the oven. A transfer arm-picker arm assembly 17 is located in the vicinity of this discharge opening 16 and is adapted to enter the oven to grasp and remove a heated parison and to move upwardly and then horizontally above opposing halves 19 of a mould. Located just beneath the space between the two mould halves 19 is a threading and holding assembly 18. The assembly 17 lowers the parison between the open mould halves 19 until the lower end of the parison is grasped and held by the assembly 18. The transfer arm and picker arm assembly 17 then rises upwardly, stretching the parison after which the mould halves 19 close. The assembly 17 then moves back to its original position over the opening 16, meanwhile dropping the scrap upper piece of the parison into the chute 20. After the container has been formed in the mould, the mould halves 19 separate and the finished container is removed through discharge tube 21.

The elements 17 through 21 are mounted on a raised base 22 which is located to the left of the oven 11 (as viewed in FIGS. 1 and 2).

The various portions of the apparatus, which have been described only generally with respect to FIGS. 1 and 2, will now be described in specific detail with reference to FIGS. 3 through 15.

Figure 3:
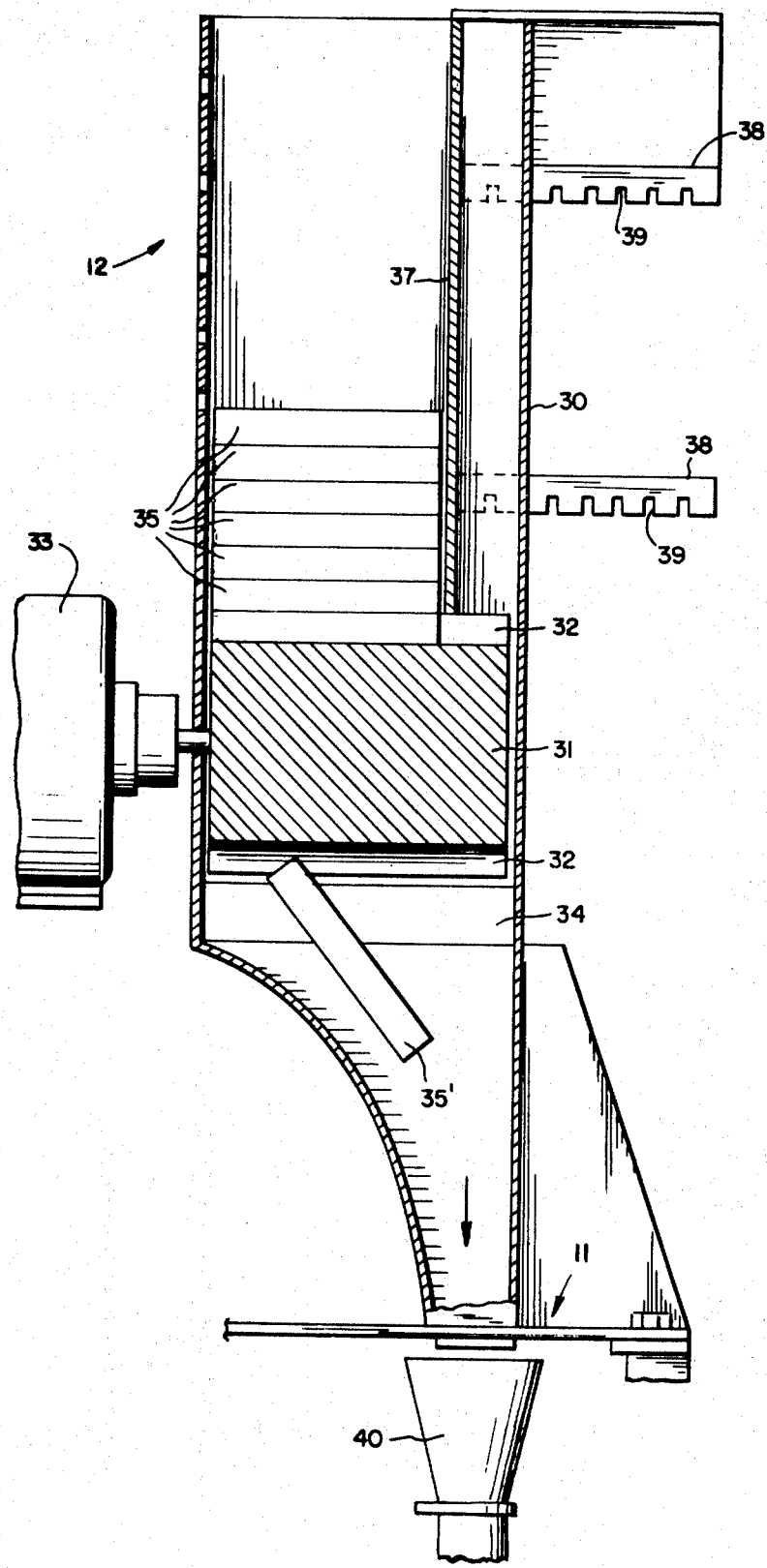
FIG. 3 is a sectional view of a feeder assembly, taken along line 3—3 of FIG. 2.

The parison feeder 12 is shown in detail in FIG. 3 and details are also shown in FIGS. 1 and 2.

The parison feeder 12 includes a generally rectangular hopper 30 having a bottom 36 for receiving tubular parisons 35 (see FIG. 3). The bottom 36 is open at the middle. Below this bottom 36, and extending upwardly through the said middle opening, is a rotor 31 having a pair of elongated grooves 32, each groove of sufficient depth to receive a tubular parison therein. This rotor 31 is turned at a speed in time with the oven conveyor chain 50 by a right angle gear unit 33 for delivering parisons 35 to a vertical chute 34. Each groove 32 thus receives a parison at its upper position and drops it into the chute 34 at its lowermost position. The chute 34 is so curved that a parison dropping down this chute turns 90° and becomes vertically oriented after which the parison is received in a vertical guide tube 40 which delivers the parison onto the conveyor in the oven 11. For efficient operation, it is apparent that a parison 35 should drop into a groove 32 each time that a groove 32 reaches its uppermost position. Such efficiency of operation requires that the parisons be laid neatly across the hopper 30. However, to assure this arrangement, the width of the hopper 30 (as in FIG. 3) should be approximately the same as the length of the tubular parisons. However, it is of course apparent that the hopper 30 must be capable of delivering parisons of different sizes. Therefore, to render the hopper adjustable, a plate 37 extends across the hopper and the position of this plate across the hopper 30 (as viewed in FIG. 3) is determined by adjusting arms 38 having notches 39 formed in the bottom thereof for securing the plate 37 at a given position.

The purpose of the oven 11 is to heat the parisons slowly and uniformly. In one examplary embodiment of the invention, the oven is capable of carrying 271 parisons, and when heating parisons of polypropylene having an outside diameter of 1.033 inches and a length of from 5 to 6 inches, the oven will be heated to a temperature of approximately 326° Fahrenheit and each parison will travel in the oven for 36 minutes and will become heated to a temperature of approximately 318° Fahrenheit. It is to be understood however that the invention is in no way limited to this exemplary data.

The parisons are received from the parison feeder 12 into the tube 40 (see the upper righthand corner of FIG. 4) from which they fall into one of the 271 pins carried by the conveyor chain 50. This chain 50 with the parisons traveling thereon moves by sprockets 51 through 58, respectively. The parisons are removed at the discharge station 16 which is located just above the sprocket 58. The empty pins then travel from sprocket 58 by sprocket 59 and sprocket 60 where they receive a new parison. Although not illustrated in the drawing, it will be appreciated that the parison feeder 12 could be provided above the sprocket 59 instead of the sprocket 60. This would permit each parison to remain in the oven a longer period of time, namely the time required to travel between the sprockets 59 and 60. However, this additional time is not always required and hence on numerous occasions it is quite practical to have the feeder 12 located as shown in the drawings. However, this also illustrates the flexibility of the present invention. Assuming that the oven is constructed with a guide tube 40 and its associated parison receiving apparatus at each of sprockets 59 and 60, then to move the feeding position, it is only necessary to unbolt the feeder 12 from the illustrated position and move it to the position over the sprocket 59.

A drive shaft 49, which may be operated by any suitable power means, turns the sprocket 58 to drive the chain conveyor 50.

Figure 4:
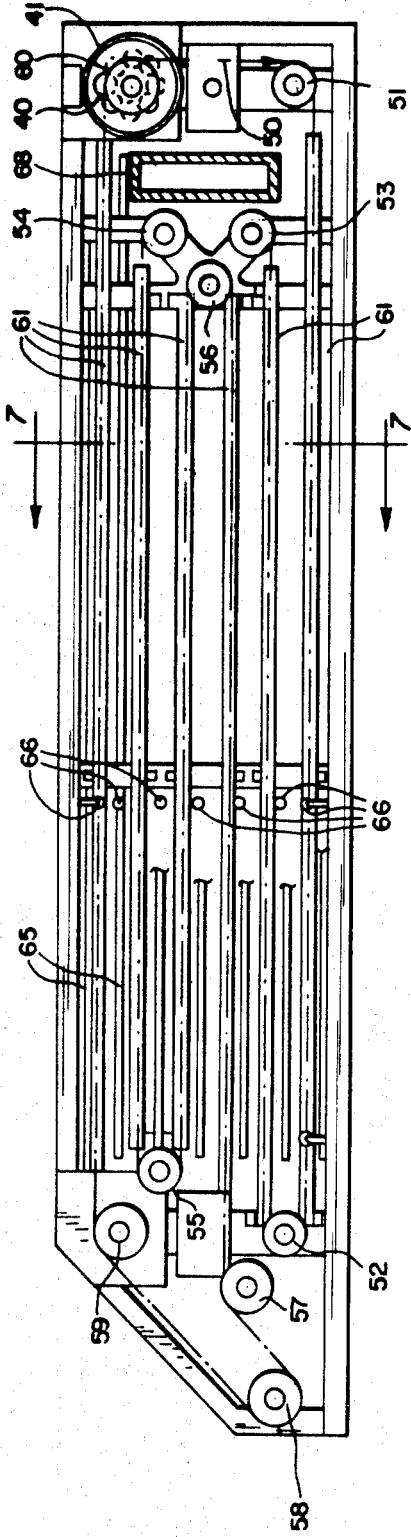
FIG. 4 is an enlarged plan view of an oven, which view is similar to FIG. 2 but with the top of the oven removed.

A system of chain tracks 61 extends through the oven and is visible in FIG. 4.

Figure 5:
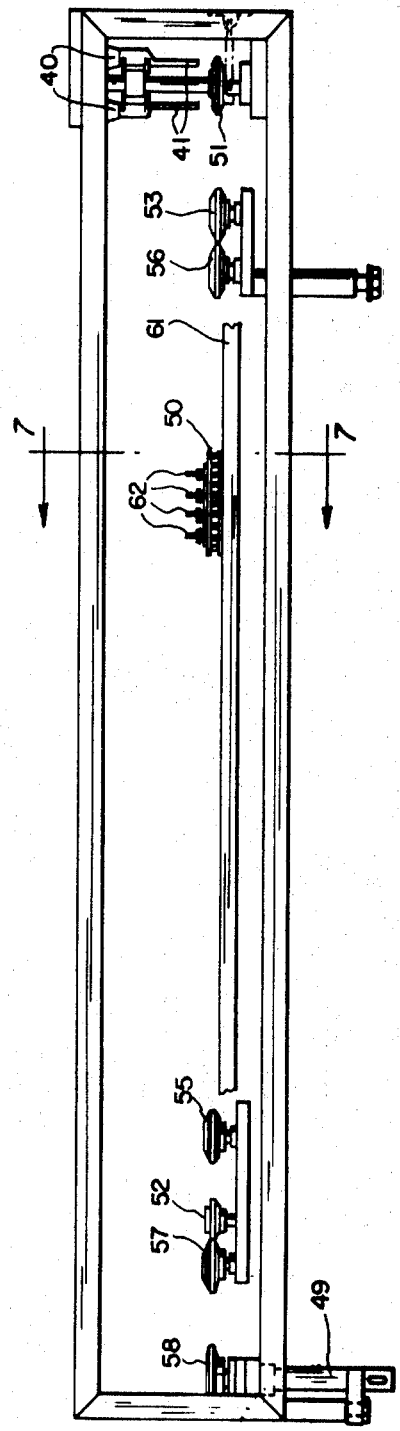
FIG. 5 is an enlarged side view of the oven, which view is similar to FIG. 1 but wherein the side plate has been removed.
Figure 7:
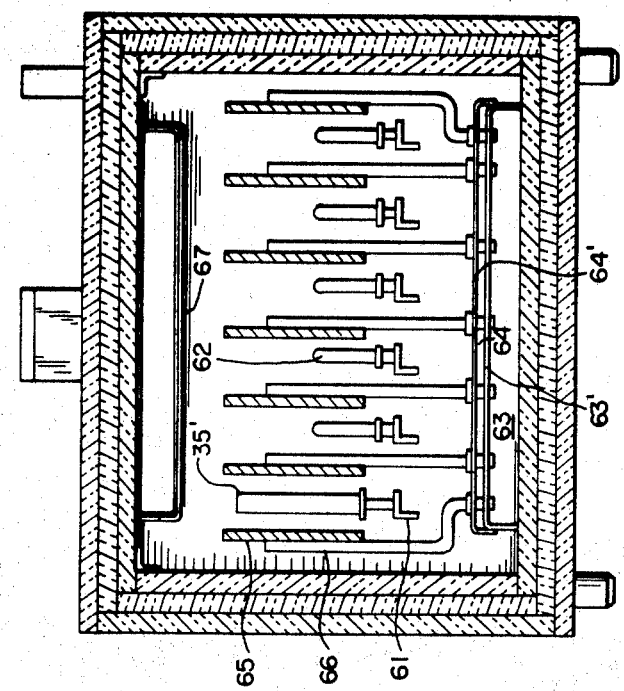
FIG. 7 is a cross-sectional view of the oven taken along line 7—7 of FIGS. 4 and 5.
Figure 6:
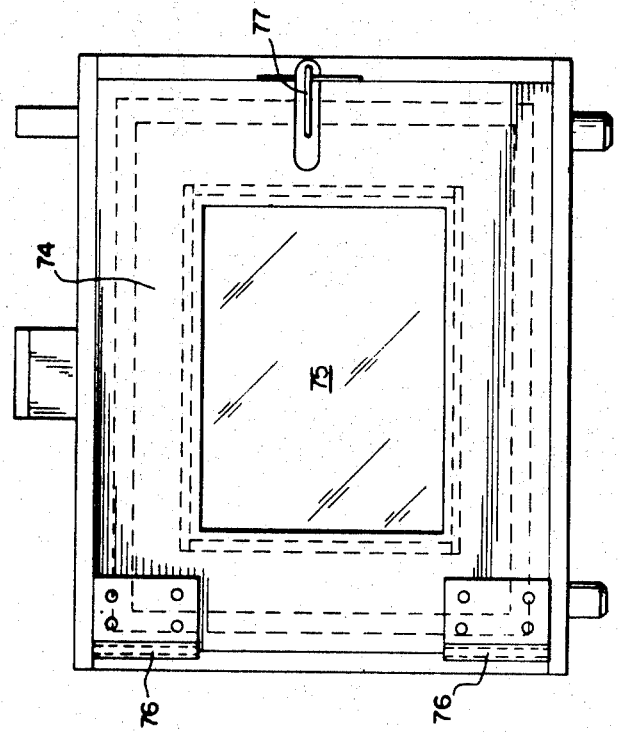
FIG. 6 is an enlarged end elevation view of the oven, as viewed from the righthand side of FIG. 1.

A portion of the chain 50 is shown in detail in the middle of FIG. 5. Four of the 271 parison pins 62 are shown here conncted to the chain 50. All other parison pins are connected in the same manner. Also shown in FIG. 5 are the details of the guide tube 40. Actually, a pair of guide tubes 40 is provided on for rotation about a loading wheel 41.

As noted above, the oven is constructed in order to provide a steady and uniform flow of heated air through the oven. To accomplish this, the oven includes a main inlet duct 63 which receives the heated air from heater 13 and which extends the entire length of the oven. This duct is shown in cross-section in FIG. 7. The plate 63' which forms the top of duct 63 has a plurality of apertures therein. Immediately above the duct 63 is a second duct 64 which is much smaller in height than 63. The top of duct 64 is formed by a plate 64' which includes a plurality of apertures which are offset from the apertures in plate 63'. This provides a high pressure drop and prevents jets of air from flowing directly from the inlet duct 63 through to the oven space above the plate 64'. Thus, uniform heat distribution is assured, at least in part, by the high pressure drop of the incoming air through the plate 63'. Above these ducts 63 and 64 there is provided a set of vertical, preferably corrugated baffle plates 65 which extend for the full length of the oven and which are connected to the plates 63' and 64' by suitable rods 66. These plates assure even upward movement of the heated air and prevent cross-flow of the rising air between the rows of conveyor 50. The baffles also assure equal radiation from all directions as the parisons pass through the oven. In this way, the cold wall effect is eliminated. Spaced slightly above the plates 65 is an outlet duct 67 which also extends for the full length of the oven and which is visible in cross-section in FIG. 7. This duct is of course apertured on its bottom side for receiving the upwardly flowing air. From the duct 67 the air travels downwardly through the return duct 68 to the inlet duct 69 of the fan 70 which in turn is operated by a motor 73 for blowing the returned heated air by a air flow valve 71 through the air heater 13 and then through a duct 72 to the said inlet duct 63. For viewing and inspecting the inlet end of the oven there is provided a door 74 mounted on hinges 76 and having a handle 77. The door also includes a plexiglass viewing window 75.

Figure 8:
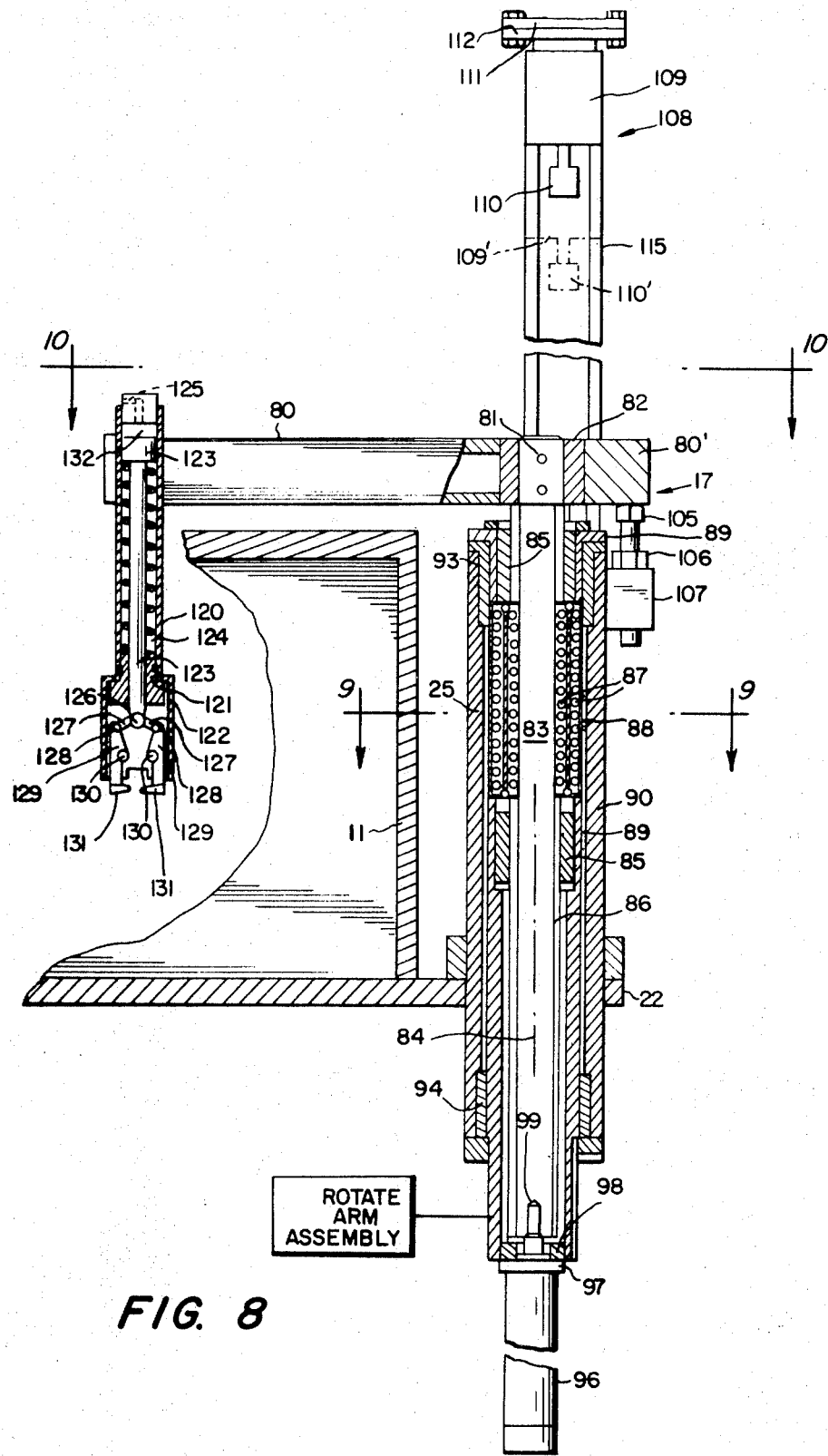
FIG. 8 illustrates the transfer arm-picker arm assembly and is taken along line 8—8 of FIG. 2.

FIGS. 8 through 10 illustrate the transfer arm-picker arm assembly 17 in greater detail. This assembly includes a transfer arm 80 connected by pins 81 and a rectangular mounting block 82 to a spindle 83 which is turnable about its axis 84. The spindle 83 is also capable of sliding vertically parallel to its axis, and thereby raising and lowering its transfer arm 80. The spindle 83 is supported for sliding movement in bearings 85. Further, the spindle 83 is splined and includes grooves 86 running for the full length of the spindle. Rolling balls 87 of a ball bearing spline 88 extend into the grooves 86. Fixed to the spline 88 for movement therewith is a further tube 89. The elements 88 and 89, which are fixed together, are separated from an outer tube 90 by bearings 93 and 94. The outer tube 90 is fixed by means for mounting plate 95 to the raised main frame 22. However, 88 and 89 are turnable within this outer tube 90. Thus, it can be seen that any turning movement applied to the tube 89 will be applied through the ball bearing spline 88 and the balls 87 to the spindle 83, and this will be the case regardless of the vertical position of spindle 83 since the grooves 86 therein extend for the full length of the spindle 83. Referring to FIG. 9, it can be seen that the outer tube 90 includes a set of opposed openings 91 through which extend lugs 92 (one of which is shown) which are fixed to 89. Thus, by turning lug 92 about axis 84, one accomplishes turning movement of the spindle 83 and hence also of the transfer arm 80.

Vertical movement of this spindle 83 is carried out by means of a hydraulic cylinder 96 fixed to the lower end thereof. The hydraulic cylinder unit is conventional and thus is not shown in detail. It is sufficient to note that the element 96 is connected through the flange element 97 and the disc 98 and through the bolt 99 to the bottom of shaft 83 for movement therewith.

As is evident from FIG. 8, the spindle is shown in its lowermost position whereat the transfer arm 80 lies just above the top of the oven 11. At this point an extension 80' of the transfer arm 80 abuts an adjustable down stop bolt 105 which has a locking nut mounted thereon and which is supported by a bracket 107 which is in turn fixed to the outer tube 90. Upward movement of the spindle 83, and hence also of the transfer arm 80 is limited by an up stop assembly 108 which is mounted on support columns 115 above the transfer arm 80. Specifically, upward movement of transfer arm 80 is limited by engagement with a stop nut 110. For reasons to be explained in greated detail below, the vertical position of this stop nut 110 must be changed to different positions during normal operation of each cycle of the apparatus. Therefore, assembly 108 includes a vertically movable pneumatic cylinder 109 slidable relative to a piston 111 which is in turn connected through a flange element 112 by means of nuts and bolts to the support columns 115. Stop Nut 110 is fixed to cylinder 109 for movement therewith. A lowered position of 109' and 110' is shown in dotted lines in FIG. 8. Movement of the pneumatic cylinder 109 will be synchronized with the other elements of the overall apparatus so that the element 110 assumes the correct position during the various stages of the cycle, as will be explained in greater detail below.

Also shown in FIG. 8 is the picker arm which includes an outer housing 120 whch is fixed with respect to the transfer arm 80 and includes at the lower end thereof a bearing 121 fixed to the housing 120. The housing includes an enlarged lower portion 122. A central piston 123 extends for the full length of the housing 120 and includes an enlarged head at its upper end which extends across the entire cross-section of the interior of housing 120. A spring 124 urges the head of 123 upwardly while downward movement thereof is provided by pneumatic fluid entering a passageway 125 in a head member fixed to the housing 120.

At its lower end, piston 123 is connected by a pivot connection 126 to a pair of upper links 127 which are in turn connected at pivot connections 128 to lower links 129. These lower links are turned about pivot pins 130 which are connected to the housing portion 122 and these lower links 129 include at their lower ends picker jaws 131 which may be moved inwardly and outwardly with respect to each other. Thus, it can be seen downward movement of 123 will cause the jaws 131 to move towards each other to grasp and hold an element such as a parison located therebetween. Similarly, upward movement of the element 123, which will occur when the pressure is released from line 125 and the spring 124 urges the element 123 upwardly, will cause the jaws 131 to separate from each other.

Figure 12:
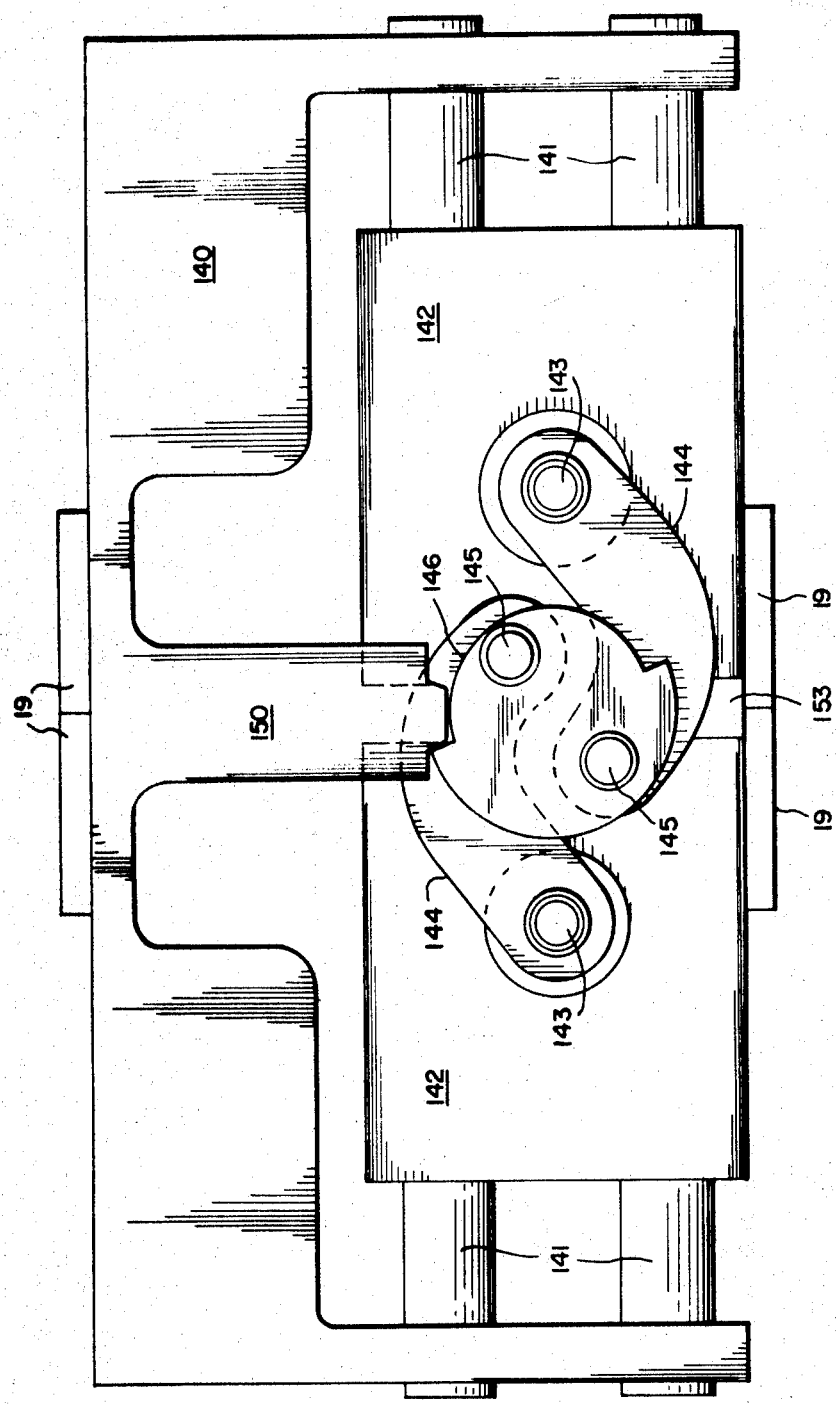
FIG. 12 is a view similar to FIG. 11 but showing the elements when the mould is in the closed position.

FIGS. 11 and 12 illustrate the means for opening and closing the mould halves 19. This apparatus includes a clamping frame 140 having a pair of guide rails 141 extending completely across the frame 140 and supported in the center by support 153. Mounted on these guide rails are two carriages 142, each of which is rigidly connected by means of an arm 154 (see FIGS. 1 and 2) to one of the mould halves 19.

FIGS. 11 and 12 illustrate the same view of the same elements except that in FIG. 11 the mould halves 19 are separated (as they are in FIGS. 1 and 2) while FIG. 12 illustrates the same elements in the moved position with the mould halves 19 closed together.

The two carriages 142 are connected together by means of curved toggle levers 144 which are connected at their outer ends at pivot connections 143 to their respective carriages 142 and are connected at their inner end at pivot connections 145 to a central driving disc 144 which is rotated back and forth by a drive motor 147 (see FIG. 2). An abutment 150 fixed to the frame 140 extends downwardly and includes first and second abutment edges 151 and 152. In the open position, as shown in FIG. 11, a first abutment surface 148 on the disc 146 engages surface 151 and thereby limits rotation of the disc 146 in the counterclockwise direction. This represents the fully separated position of the carriages 142 and thus of the mould halves 19. To close the mould, that is to move the elements to the position shown in FIG. 12, the disc 146 is turned clockwise until the edge 149 engages surface 152. Inward movement of the carriage 142 is stopped by the mould faces making contact with each other.

In operation, very high pressures are exerted at the interior of the mould where the container is being formed. The curved overlapping toggle arrangement shown in FIGS. 11 and 12 is particularly advantageous for this application since it requires a greater force to separate the two curved, overlapping toggles 144 than would be the case if straight toggle levers were used. For example, if in fact the straight toggle levers were used, then any force tending to separate the mould halves 19 would tend to act in the direction of movement of the straight levers themselves since the force would normally act in a direction parallel to the path which the levers follow when they separate. However, with the present arrangement any force tending to force the mould halves 19 would tend to pull the pivot point 145 in a horizontal direction. But in contrast with straight levers, in the present case the ends of the curved levers at the disc 146 must travel not horizontally but outwardly (up or down) and then horizontally. Thus, when the mould is closed, only a portion of the force tending to separate the mould halves 19 would in fact act to separate the carriages 142 and hence the mould halves 19.

The drive motor 147 may be a "Rotac" unit made by Excello Corporation and the toggle mechanism can withstand a separating force of 10,000 pounds.

Figure 13:
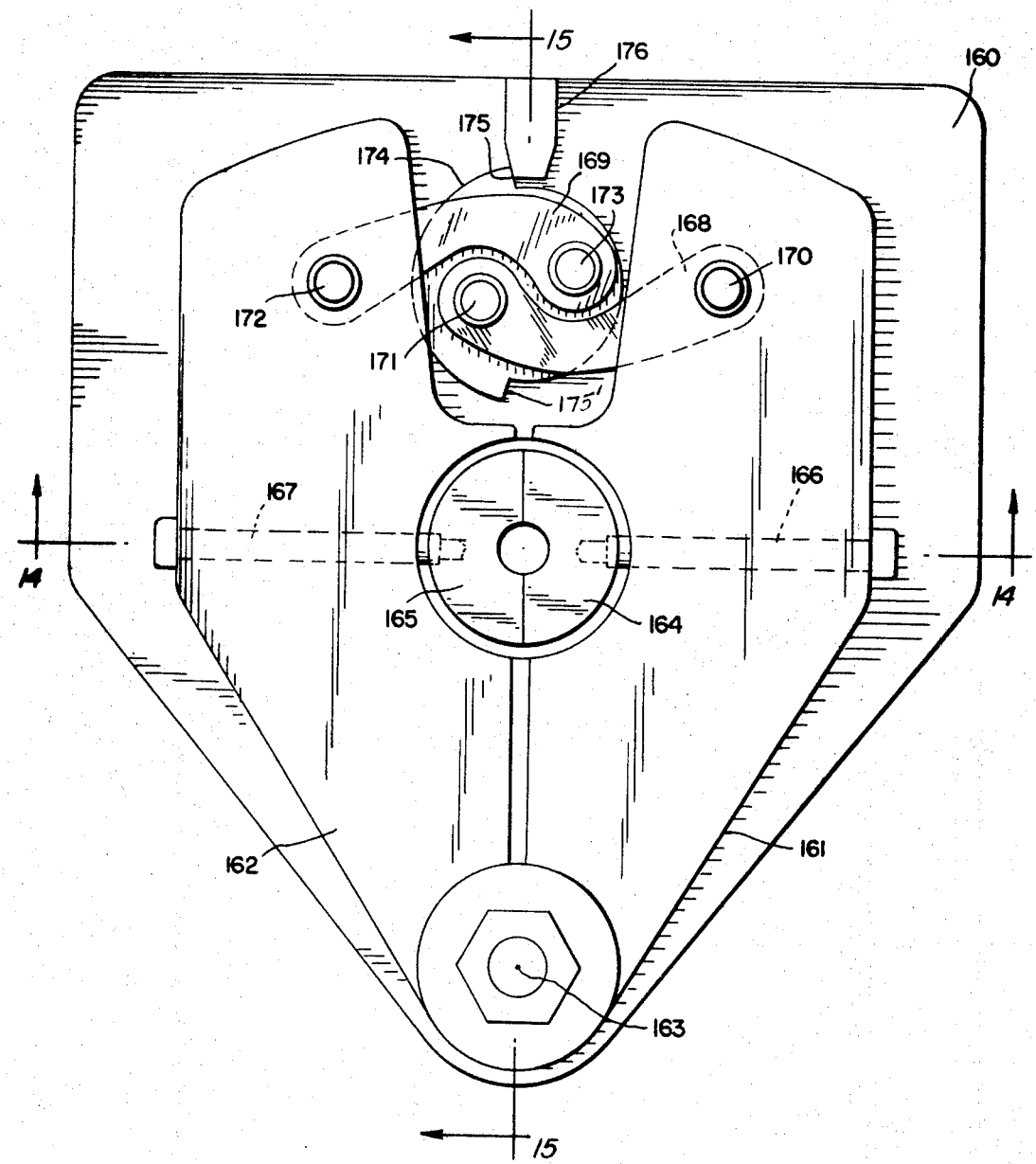
FIG. 13 is a plan view of the thread forming and holding assembly and is taken in the direction of the arrow A in FIG. 1.
Figure 14:
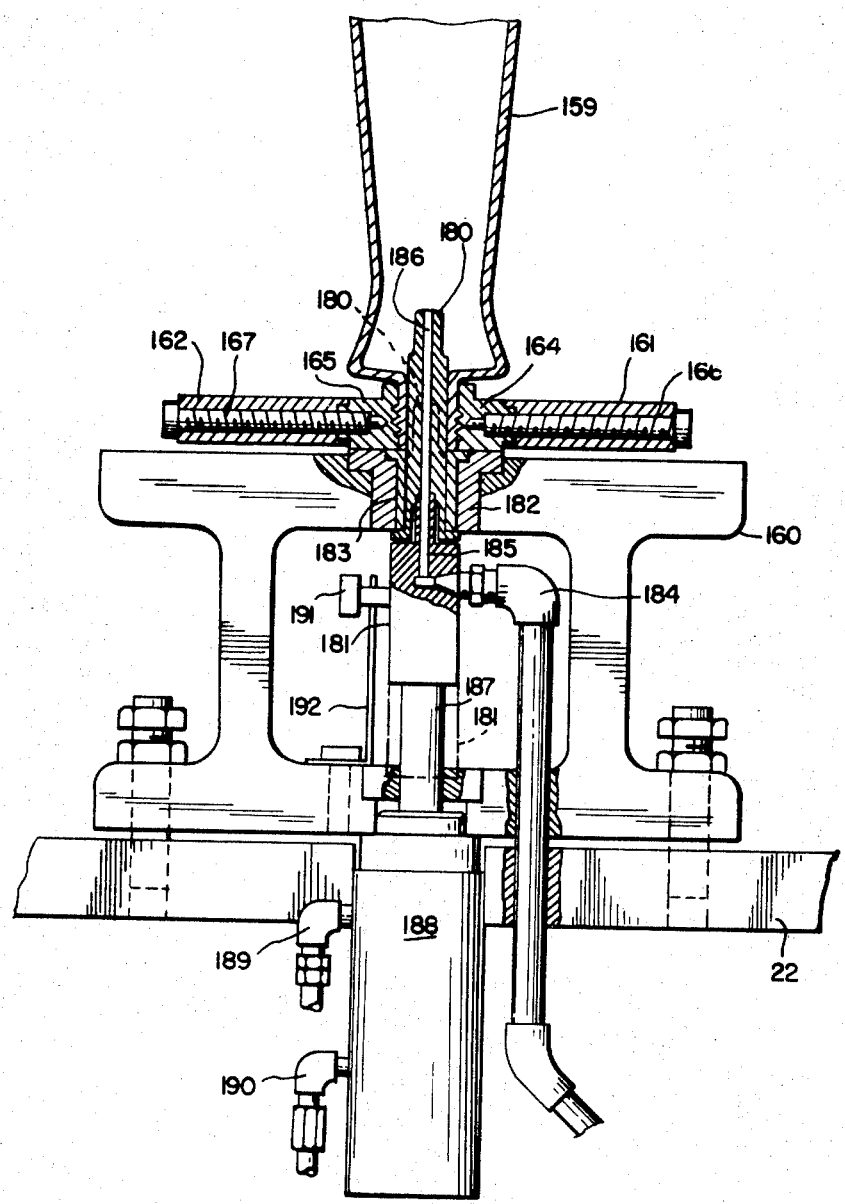
FIG. 14 is a cross-sectional view taken along line 14—14 of FIG. 13 and showing a bottle in the mold.
Figure 15:
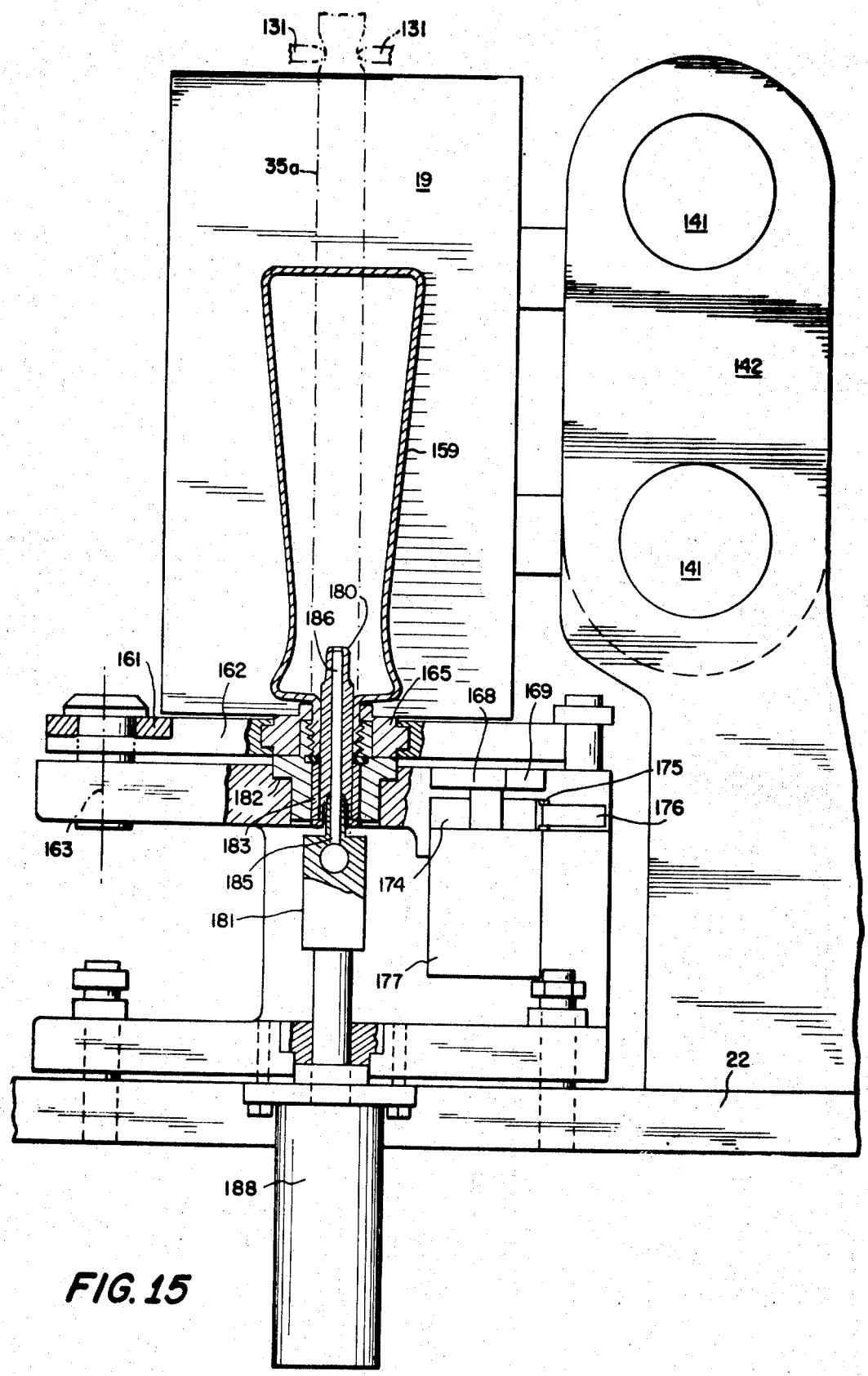
FIG. 15 is a cross-sectional view taken along line 15—15 of FIG. 13 showing a bottle in the mold.

FIGS. 13 through 15 illustrate in detail the thread forming means 18.

First, in the upper portion of FIG. 15 there is shown a container, in this case a bottle 159 of the type which might be formed by the present apparatus from the tubular parison, for example as shown in FIG. 3.

Referring now generally to FIGS. 13 through 15, the assembly 18 includes a thread assembly frame 160 which is mounted directly on the frame 22 by suitable bolts or the like. As best shown in FIG. 13, the thread forming means includes a pair of arms 161 and 162 rotatable about the axis 163, this axis also being shown clearly in FIG. 15. A thread die 164 is connected to a semi-circular recess formed in the arm 161 and held there by a bolt 166 which passes completely through the arm 161. This bolt is shown in both FIG. 13 and FIG. 14. Similarly, a mating thread die 165 is mounted in a semi-circular recess formed in the arm 162 and held there by a similar bolt 167. The two arms 161 and 162 are urged together and separated by a mechanism identical to that used for controlling the closing and opening of the mould halves 19. In the thread assembly, this means includes a pair of toggle levers 168 and 169, the former attached to arm 161 at pivot 170 and the latter attached to arm 162 at pivot 172. Beneath the levers 168 and 169 is a rotating disc 174 which is similar to the disc 146 in FIGS. 11 and 12. This disc has a pair of abutment edges 175 and 175' which limit the clockwise and counterclockwise rotational movement of the disc 174, respectively, by engagement with an abutment member 176 which is similar to the abutment member 150 in FIGS. 11 and 12. Lever 168 is connected to the disc 174 at pivot connection 171 and lever 169 is connected to the disc 174 at pivot connection 173. In the same manner as in FIGS. 11 and 12, only a small component of the force tending to separate the arms 161 and 162 is effective to urge separation of the levers 168 and 169. Turning movement of disc 174 is provided by a motor 177 (see FIG. 15).

Also included in the assembly 18 is a vertically movable plug member and a means for introducing air under pressure into the container 159 which is being formed. Referring specifically to FIGS. 14 and 15, this apparatus includes a plug 180 which is movable vertically to the raised position as shown in solid lines in FIGS. 14 and 15 to a lowered position as shown in dotted lines in FIG. 14. This plug is connected to an adaptor member 181 and is surrounded by a bushing 183 which slidingly supports the plug 180 and a wear plug 182, the latter being held firmly within the frame 160. An air line 184 delivers pressurized air to a passage 185 in the adaptor 181 which in turn delivers air to a passage 186 in the plug 180. At the appropriate times, as will be explained in detail below, air under pressure is introduced through this line 184 and hence into the bottle 159.

Vertical movement of the plug 180 is provided by a double acting hydraulic cylinder and piston unit 188 which is supplied at its respective ends with fluid under pressure through lines 189 and 190. This cylinder 188 is connected to the adaptor 181 through a suitable rod 187. The lowered position of the plug and its associated elements is also illustrated by the lowered dotted line position of element 181 in FIG. 14.

After the mould halves 19 have been separated and the bottle 159 has been completely formed, the arms 161 and 162 separate and the bottle is ejected by being urged upwardly by air passing through the line 186 and into the bottle. This bottle, thus thrown upwardly is received and removed by the finished bottle discharging unit 21, as shown in FIGS. 1 and 2. When the mould separates, the flexible tube 203, and particularly the flared end 207 thereof is positioned directly over the bottle so that when the bottle is thrown upwardly it is received within this tube through which it is drawn outwardly to a receiving station. The lower end of tube 203 is held by a tube carrying arm 201 which has fixed thereto a downwardly extending pin 202 which is received loosely in a hollow support tube 200 which is fixed to the base 22. Thus, the arm 201 is permitted to rotate about a vertical axis through the tube 200. This arm 201 is normally urged to the position over the mould by means of a spring 206 acting between a first fixed element 204 connected to the tube 200 and a second flanged element 205 connected to the arm 201. However, this arm 201 is also connected through a suitable mechanical connection such as a cam or the like to the transfer arm-picker arm assembly 17 so that whenever the assembly 17 moves into the area above the mould 19, the arm 201 automatically swings counterclockwise (as viewed in FIG. 2) from the position over the mould 19 in a direction outwardly away from the mould 19 as shown by the arrow B in FIG. 2.

Figure 16:
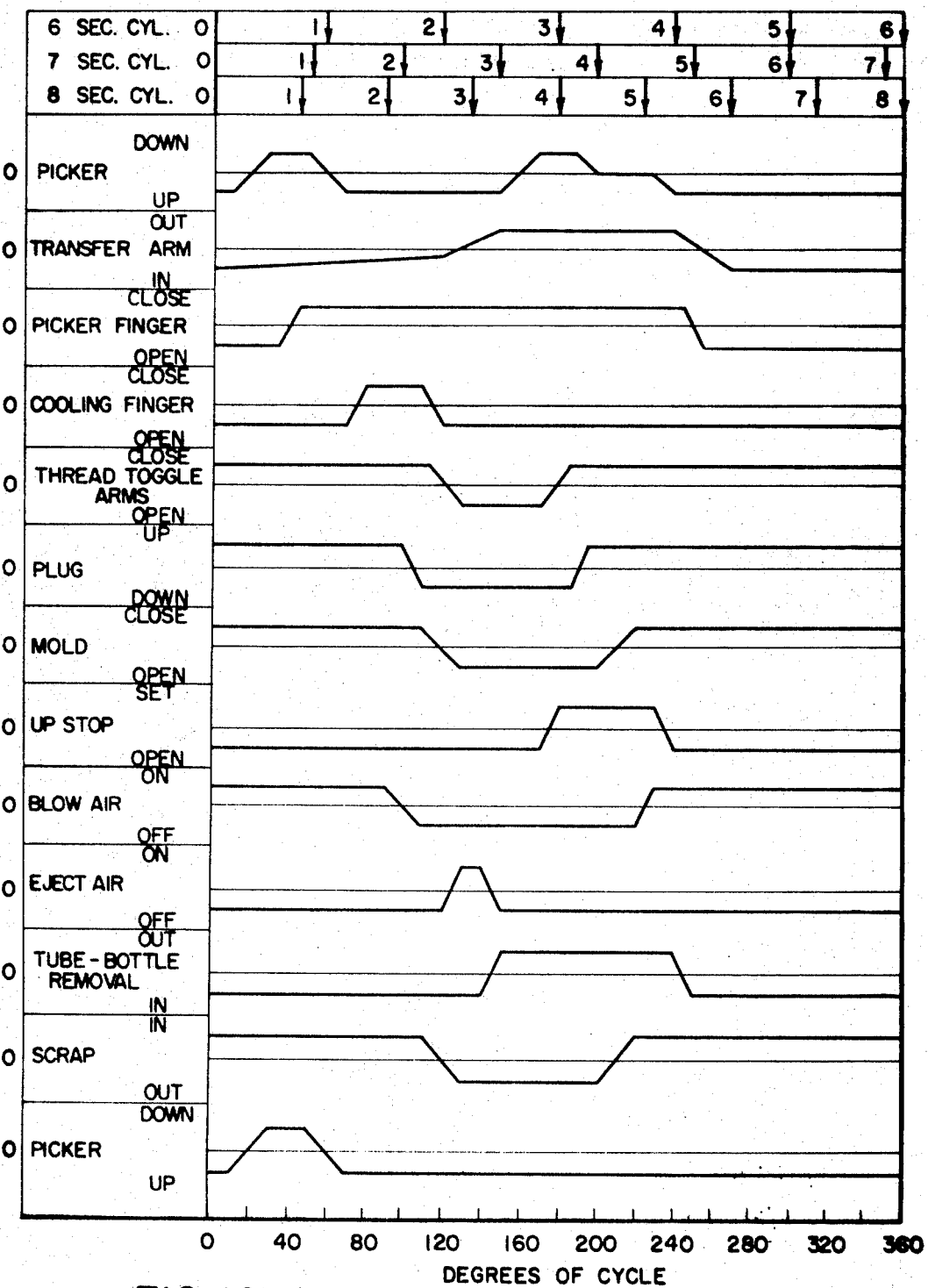
FIG. 16 is a graph illustrating the operation of the invention.

The operation of the apparatus and also the method of the invention have been described in part during the discussion of the various components of the apparatus. However, for further clarity, a summary of the method and operation of the invention will now follow. For a further understanding of this operation, reference is made also to FIG. 16 which shows the interrelated movements of the numerous components of the invention for three different time cycles, namely a 6 second cycle, a 7 second cycle and an 8 second cycle.

Assuming that it is desired to convert tubular parisons 35 into bottles 159, the parisons are first stacked neatly in the hopper 30 of the feeding device 12 with the assistance of plate 37. These parisons are fed by means of grooves 32 in the rotor 31. If the speed of conveyor chain 50 is such that rotor 31 rotates at a speed of four revolutions per minute, and assuming the rotor 31 includes two grooves 32, this of course means that eight parisons 35 will be delivered into the oven 11 through chute 35 per minute, that is, one parison would be introduced every 7.5 seconds. If the cycle time is to be reduced, the conveyor chain 50, and hence also the rotor 31 would be speeded up accordingly. In the oven 11, the parisons are received on pins 62, on which they travel along conveyor 50 through the baffle system becoming uniformly heated. The number of parisons held by the oven is selected to suit both the heating cycle and the forming cycle. For example, for a heating time of 36 minutes and a cycle time of eight bottles per minute, the oven will hold 288 parisons which equals 36 minutes times, eight parisons per minute. Similarly, for 40 minutes and 10 parisons per minute the oven will hold 400 parisons, etc. The importance of uniform heating of the parisons cannot be overemphasized. If the parison is not heated to the same temperature uniformly along its length, then it will not be stretched uniformly at a later point in the operation and hence the resultant bottle 159 may be defective in that it may vary in thickness by an unacceptable amount from one end to the other. Although the conveyor 50 could possibly be indexed, in a preferred embodiment of the invention it moves continually through its illustrated path. To compensate for this, the transfer arm-picker arm assembly 17 is constructed so that when the lower end of the picker arm extends into the opening 16 at the discharge station, it moves slightly in its curved path about axis 84 as the jaws 31 grip a parison.

As soon as a parison has been firmly grasped by jaws 131, the cylinder 96 is actuated to raise the spindle 83 thereby raising the picker arm and the parison being grasped thereby. At first the picker arm stops at its raised position whereat the first parison is gripped by cooling fingers 15 (which are not shown in detail in the present drawings) which simply cool the parison locally to a uniform but slightly lower temperature. Suitable mechanical means, not shown, then actuate the lugs 92 to turn the tubular elements 88 and 89, and hence also the spindle 83 and the transfer arm 80 until the parison is directly over the plug 180 and the space between the open, that is spaced apart arms 161 and 162 of the threading assembly. As explained above, this movement of the transfer arm 80 mechanically assures that the tube 203 has been moved outwardly away from its position over the threading means 18.

At this time, the cylinder 96 is again actuated to lower the spindle 83 until the bottom of the parison being held by the jaws 131 abuts the upper end of bushing 183 between the thread dies. Motor 177 is then actuated to close the arms 161 and 162 onto the lower end of the parison. Plug 180 is then raised. This serves several purposes. First, it positively positions the bottom of the parison. Secondly, it positively sizes the inside of the threaded area. Thirdly, it pushes material into the thread die cavities and it swedges the material in the lip area and pushes material up into the shoulder area. Another function of the thread dye assembly is to firmly hold the bottom of the parison as the jaws 131 are raised to stretch the parison. FIG. 15 illustrates in dotted lines the parison 35 after it has been stretched. Note the length of the parison 35a in FIG. 15 in comparison to the length of parison 35 in FIG. 3. During this stretching procedure, the jaws 131 should not be permitted to rise to their maximum height at which they were located when they carried the parison from the oven to the area of the mould. Thus, the upward movement of the arm 80 and hence the picker arm and the jaws 131 must be limited. For this purpose the stop nut 110 shown in FIG. 8 is lowered as the stretching procedure takes place. Thus, upward movement of the jaws 131 during stretching is limited by engagement of the arm 80 with the stop nut 110 in its lowered position 110' as shown in FIG. 8.

After the parisons have been stretched, motor 147 is operated to close the two mould halves 19. At a level as shown in FIG. 15 corresponding to what will be the bottom of the bottle (that is the closed upper end as shown in FIG. 15) the parison is cut by the mould. At this point two events occur concurrently. First, the stop nut 110 is raised to its uppermost position permitting maximum rise of the transfer arm-picker arm assembly so that the scrap portion of the parison, that is the portion above the cut, is moved upwardly above the mould. The arm 80 then swings counterclockwise (as viewed in FIG. 2) as the transfer arm again returns to its position over the discharge opening 16 of the oven 11. However, en route to this position the transfer arm 80 moves over the chute 20 whereat the jaws 131 are separated so that the scrap portion is permitted to run down the chute 20 into a suitable receptacle. The transfer arm 80 then continues its travel to the oven to grasp another parison after which it commences its return to the mould. Meanwhile, concurrently with above described movement of the arm 80, air under pressure is introduced through line 184 and hence through passages 185 and 186 into the closed portion of the parison remaining in the mould. Of course in a conventional manner the faces of mould halves 19 are of the shape of the bottle 159 to be formed so that the air under pressure causes the hot parison to move against the walls of the cavities formed in mould halves 19, thereby forming and shaping the bottle 159. Meanwhile, since the transfer arm 80 has moved back to its position over the oven 11, the arm 201 has been permitted, under the influence of its spring 206, to move back to the position over the mould halves 19. Motor 147 is now operated to separate the mould halves and motor 177 is operated to separate the arms 161 and 162. Air is again introduced into the passage 184, and hence 185 and 186 and into the bottle 159. However, this time since the mould is open and the arms 161 and 162 are separated, this air causes the bottle 159 to be thrown upwardly whereat it is received in and carried away through the tube 203.

One advantage of the present invention is the simplicity which results from the arrangement of the various components of the assembly. As explained above, the various components cooperate with each other in an extremely advantageous manner in order to carry out the purposes of the invention. Notwithstanding this, however, the various components are individually mounted on a common base such that any one of the major components can be dismantled and removed from the apparatus for servicing or repair without disturbing the other components of the assembly. Stated differently, the assembly is of a "modular" construction, each of the major components of the assembly comprising one module thereof. For example, the feeding means 12 can be removed from the top of the oven and located at a different position. Further, any one of the transfer arm-picker arm assembly 17, the threading assembly 18, the mould frame 140, the scrap discharge chute 20 or the finished bottle discharge chute 21 can simply be unbolted and removed from the raised main base 22. Of course, it is also possible to remove the oven 11. However, in view of its size, relative to the remaining components of the assembly, this would not normally be practical.

As explained above, the various components of the assembly cooperate with each other by operating in synchronism with each other to carry out the purposes of the invention. This may be carried out, for example, by operating all of the various valves which control the flow of pressure fluid to the various components by means of a common rotary switch having a plurality of cams mounted thereon, each cam controlling a different valve and/or a different component of the assembly. For example, one cam on the rotary switch may be provided for each of the following: (a) hydraulic cylinder 96 for raising and lowering the spindle 83, (b) a furtherhydraulic device for turning the spindle 83, (c) fluid through line 25 to the space 132 for controlling the jaws 131, (d) the pneumatic cylinder 109, (e) the rotary unit for opening and closing arms 161 and 162, (f) the rotary unit for opening and closing the mould halves 19. Turning of the arm 201 may also be controlled off of this same rotary switch. However, in the preferred embodiment, this member is simply connected directly and mechanically to the transfer arm to be moved in response to rotary movement thereof.

Although the invention has been described in considerable detail with respect to a preferred embodiment thereof, it will be apparent that the invention is capable of numerous modifications and variations apparent to those skilled in the art without departing from the spirit or scope of the invention.

I claim:

1. An oven for uniformly heating elongated elements comprising, a conveyor for carrying said elements along a plurality of generally side by side paths back and forth within the oven, air flow control means for directing the heated air vertically through the oven from the bottom to the top thereof, said air flow control means including generally vertical baffles between said paths, a heated air inlet duct below these paths and an outlet duct above these paths and means for directing the air flow from the inlet duct uniformly up through said paths between said baffles and out through the said outlet duct.

2. An oven according to claim 1, said inlet duct comprising a pair of generally flat ducts at the bottom of the oven and extending for most of the length and width of the oven, the lowermost inlet duct being thicker in the vertical direction than the upper inlet duct, and having openings on its upper surface leading into the upper inlet duct, and the upper inlet duct having openings offset horizontally from the first said openings and leading to the main area of the oven containing the said conveyor, whereby heated air flows evenly from the inlet ducts throughout the oven.

3. An oven according to claim 2, including an outlet duct above the oven conveyor and extending for most of the length and width of the oven, and including openings in the bottom of this outlet duct for receiving and removing heated air after the said air has arisen through the oven.

4. An oven according to claim 1, wherein the conveyor moves continuously along said back and forth paths, said paths being endless, and including feed means for feeding parisons to the oven at one point in said path and means for permitting removal of heated parisons at another point in said path by a transfer means, wherein said transfer means is capable of moving horizontally with the conveyor as it removes a parison from the oven whereby parisons can be removed without stopping the conveyor.

5. An oven according to claim 4, including a door at the end of the oven adjacent the feed means for access to the interior of the oven.

6. An oven for uniformly heating elongated articles comprising: a housing forming an enclosed oven, a conveyor for carrying said articles through the oven, a heating means external to the housing of the oven for heating air, inlet duct means for directing heated air from said heating means through an entrance in the housing wall and into the oven, an outlet duct means across the oven from the said entrance for removing said air from the oven after it had passed therethrough.

7. An oven according to claim 6, said conveyor being located within the oven and including a means for carrying the elongated articles in an upright position through the oven.

8. An oven according to claim 7, said conveyor arranged to carry the parisons through a plurality of back and forth paths in the oven, said paths being spaced generally horizontally from each other and being generally parallel to each other.

9. An oven according to claim 7, said elongated articles being parisons, means for introducing parisons into the oven at a first station, and means for removing parisons from the oven at a second station for transfer to a mold station.

10. An oven for uniformly heating elongated elements comprising, a conveyor carrying said elements along a plurality of generally parallel paths back and forth within the oven, generally vertical baffles between said paths, and a heated air inlet duct below these paths and an outlet duct above these paths, said inlet duct comprising a pair of generally flat ducts at the bottom of the oven and extending for most of the length and width of the oven, the lowermost inlet duct being thicker in the vertical direction than the upper inlet duct, and having openings on its upper surface leading into the upper inlet duct, and the upper inlet duct having openings offset horizontally from the first said openings and leading to the main area of the oven containing the said conveyor, whereby heated air flows evenly from the inlet ducts throughout the oven.

11. An oven according to claim 10, including an outlet duct above the oven conveyor and extending for most of the length and width of the oven, and including openings in the bottom of this outlet duct for receiving and removing heated air after the said air has arisen through the oven.

12. An oven according to claim 10, wherein the conveyor moves continuously along said back and forth paths, said paths being endless, and including feed means for feeding parisons to the oven at one point in said path and means for permitting removal of heated parisons at another point in said path by a transfer means, wherein said transfer means is capable of moving horizontally with the conveyor as it removes a parison from the oven whereby parisons can be removed without stopping the conveyor.

13. An oven according to claim 12, including a door at the end of the oven adjacent the feed means for access to the interior of the oven.

* * * * *